UNITED STATES PATENT OFFICE.

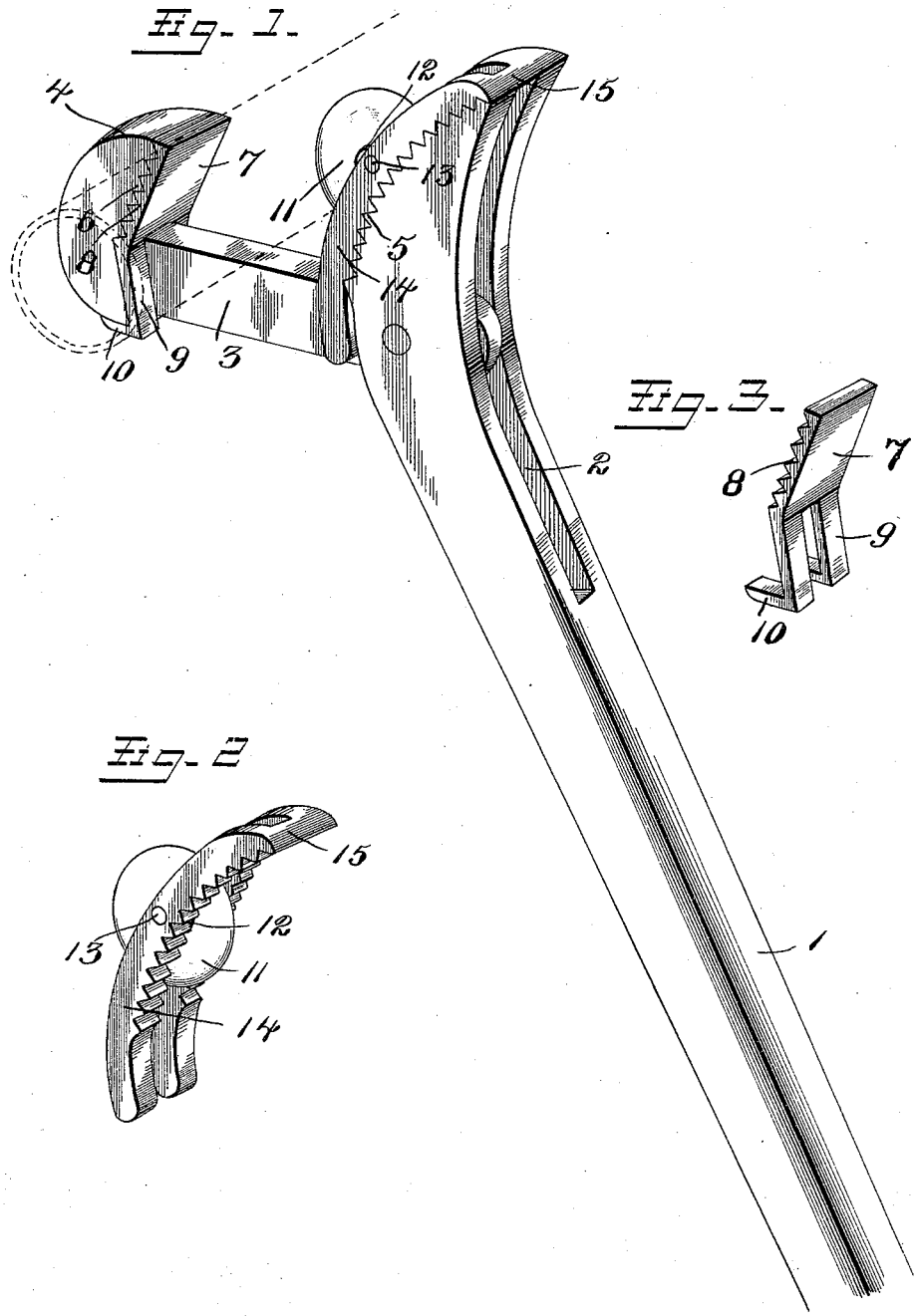

FRANK A. WHITNEY AND ARTEMAS W. WHITNEY, OF SUGAR GROVE, ILLINOIS.

PIPE WRENCH AND CUTTER.

SPECIFICATION forming part of Letters Patent No. 543,953, dated August 6, 1895.

Application filed May 21, 1895. Serial No. 550,125. (No model.)

*To all whom it may concern:*

Be it known that we, FRANK A. WHITNEY and ARTEMAS W. WHITNEY, citizens of the United States, residing at Sugar Grove, in the county of Kane and State of Illinois, have invented a new and useful Combined Pipe Wrench and Cutter, of which the following is a specification.

This invention relates to an improvement in pipe-wrenches, and has for its object to provide a simple, durable, and efficient wrench which is adapted for use in connection with pipes in the capacity of an ordinary pipe-wrench or which is capable, by means hereinafter described, of being used as a pipe-cutter.

Other objects and advantages of the invention will be disclosed in the course of the subjoined description.

To accomplish the objects enumerated the invention consists in certain novel features and details of construction and arrangement of parts, as hereinafter fully described, illustrated in the drawings, and finally set forth in the claims.

In the accompanying drawings, Figure 1 is a perspective view of a combination pipe wrench and cutter embodying the features of this invention, with a section of pipe shown applied thereto in dotted lines. Fig. 2 is a detail perspective view of the adjustable yoke carrying the cutter-disk. Fig. 3 is a similar view of the removable face-plate used in connection with the pivoted jaw.

Similar numerals of reference designate corresponding parts in the several figures of the drawings.

Referring to the accompanying drawings, 1 designates the handle or shank of the wrench, which is of metal and may be made of any desired length for affording the necessary leverage. The operative end of the shank 1 is bifurcated or provided with an open slot 2, which is adapted to receive the end of the shank 3 of the pivoted jaw 4. The operative end of the shank 1 is rounded off, as shown, and is provided upon each side of the slot 2 therein with corresponding series of teeth or serrations 5. The pivoted jaw 4 is also provided upon its inner operative face with a series of teeth or serrations 6, and it will be understood that the serrated or toothed faces of the stationary and movable jaws are intended to grip and engage firmly a section of pipe that may be placed between them in a manner that will be readily understood by those familiar with the art to which this invention appertains. The angle between the operative face of the pivoted jaw and the shank of said jaw is acute, so that the point of the jaw will project toward the operative face of the fixed jaw or shank 1 for the purpose of more effectually engaging and embracing the pipe placed between said jaws, and the teeth or serrations 6 of said pivoted jaw are preferably inclined or pointed inward toward the shank thereof, serving to resist the outward tendency of the section of pipe or its escape from between the jaws.

The means whereby the wrench hereinabove described may be adapted for use as a pipe-cutter will now be described.

7 indicates a face-plate which is smooth upon its outer or operative face. Upon its inner face the plate 7 is provided with a series of teeth or serrations 8, which correspond in size, number, and shape to the teeth or serrations 6 of the pivoted jaw, being inclined in an opposite direction, so as to intermesh and retain said face-plate securely in place. The lower end of the plate 7 is bifurcated or provided with a pair of downwardly-extending arms 9, spaced sufficiently apart to stride the shank 3 of the pivoted jaw, and the lower ends of said arms 9 are bent or hooked, as indicated at 10, in such manner as to pass beneath the main body or head of the pivoted jaw, as illustrated in Fig. 1. The face-plate 7 is in this manner effectively retained in place upon the pivoted jaw and presents a smooth face against which a section of pipe is adapted to turn when the cutter is in operation.

11 designates the cutter, which is in the form of a beveled disk having a sharp peripheral cutting-edge and provided with a central sleeve 12, by means of which it is revolubly mounted upon a pin, rivet, or bolt 13, carried by a yoke 14. The yoke 14 comprises a pair of parallel arms of about the same thickness and spaced apart to the same extent as the arms upon either side of the open slot 2 of the main shank 1 of the wrench. The arms of the yoke 14 also partake of the same curvature as the rounded end of the shank 1 and are correspondingly toothed or serrated upon their inner adjacent faces, lying contiguous to the corresponding faces of said shank. The arms of the yoke 14 are rigidly connected at their upper ends by a suitable cross-bar or web 15, while the lower ends of said arms are adapted to stride the shank 3 of the pivoted jaw. By means of this construction it will be seen that the yoke and the cutter carried thereby may be adjusted to any desired position with relation to the fixed jaw or shank 1, whereby pipes of different sizes may be received between the jaws of the cutting-tool and operated upon by the cutter.

In operation the pipe from which a section is to be cut is clamped in a vise, so that the same may not rotate. The tool is then applied to the pipe and by means of the movable yoke 14 the cutter is adjusted so as to bring it into the desired relation to the pivoted jaw and the pipe interposed between said jaw and the cutter. The tool is now turned around the stationary pipe and the sharp cutting-disk caused to operate thereon with a firm pressure. This pressure may be regulated by changing the position of the cutter in a manner that will be readily understood. It will be understood that by detaching the yoke 14 with its cutter and the smooth face-plate 7 the device is adapted to be used as an ordinary pipe-wrench.

The device is simple in construction, durable in practice, and will be found to constitute an efficient combination pipe wrench and cutter.

Changes in the form, proportion, and minor details of construction may be resorted to without departing from the spirit or sacrificing any of the advantages of this invention.

Having thus described the invention, what is claimed as new, and desired to be secured by Letters Patent, is—

1. A combined pipe wrench and cutter, the same comprising a shank having a toothed or serrated operative face and bifurcated as shown, a pivoted jaw having its shank pivotally mounted in the bifurcated end of the main shank, and a revoluble cutting disk mounted in a frame or yoke detachably supported upon the operative face of the main shank or stationary jaw, substantially as described.

2. A combined pipe wrench and cutter, comprising a stationary jaw or shank having a bifurcated end and a toothed or serrated operative face, a pivoted jaw hinged to the fixed jaw, a yoke or frame comprising a pair of arms spaced a sufficient distance apart to stride the shank of the pivoted jaw, a rotary cutter disk journaled between said arms, and means for retaining said yoke or frame in position relatively to the fixed jaw or shank, substantially as specified.

3. A combined pipe wrench and cutter comprising a stationary jaw or shank having a bifurcated end and a rounded and toothed or serrated operative face, a pivoted jaw having its shank pivoted within the bifurcated end of the stationary jaw or shank, a yoke or frame consisting of a pair of curved arms toothed or serrated upon their concaved faces or edges to engage the teeth or serrations on the main jaw or shank, said arms being spaced a sufficient distance apart to stride the shank of the pivoted jaw and united to each other by a connecting web and a rotary cutting disk interposed between and journaled in said arms, substantially as and for the purpose specified.

4. A combined pipe wrench and cutter, comprising a main jaw or shank, a swinging jaw pivoted thereto, a rotary cutting disk detachably connected with the main jaw or shank, and a removable face plate adapted to be applied to the pivoted jaw, said face plate being provided with a smooth operative face, a toothed or serrated inner face corresponding to and adapted to engage with the toothed or serrated face of the pivoted jaw, and a pair of arms adapted to embrace the shank of the pivoted jaw and provided with hooked or bent ends for engaging the head of the pivoted jaw, whereby said face plate is retained in place, substantially as set forth.

In testimony that we claim the foregoing as our own we have hereto affixed our signatures in the presence of two witnesses.

FRANK A. WHITNEY.
ARTEMAS W. WHITNEY.

Witnesses:
J. R. KING,
J. S. MILLER.